United States Patent [19]

Pellegrom

[11] Patent Number: 4,475,288
[45] Date of Patent: Oct. 9, 1984

[54] REGISTRY DEVICE AND METHOD FOR USING SAME

[75] Inventor: Leonard A. Pellegrom, Mt. Clemens, Mich.

[73] Assignee: Easalign, Ltd., Mt. Clemens, Mich.

[21] Appl. No.: 412,537

[22] Filed: Aug. 30, 1982

[51] Int. Cl.³ .............................................. G01B 5/00
[52] U.S. Cl. ................................................. 33/1 B
[58] Field of Search .............. 33/1 B, 1 C, 1 G, 1 BB, 33/174 B; 283/1 A

[56] References Cited

U.S. PATENT DOCUMENTS

| | | | |
|---|---|---|---|
| 509,073 | 11/1893 | Drake et al. | 33/1 B |
| 1,205,879 | 11/1916 | Felten | 33/1 B |
| 2,375,427 | 5/1945 | Mannino | 33/1 B |
| 2,693,035 | 11/1954 | Beck | 33/1 B |
| 2,720,028 | 10/1955 | Wolf | 33/1 B |
| 2,992,484 | 7/1961 | May | 33/1 B |
| 3,024,692 | 3/1962 | Skeggs | 33/1 B |
| 3,968,574 | 7/1976 | Ellis | 33/1 G |
| 4,262,422 | 4/1981 | Pass | 33/174 B |

Primary Examiner—Richard R. Stearns
Attorney, Agent, or Firm—Burton, Parker & Schramm

[57] ABSTRACT

A registry device is described having a transparent cover having positioning indicia thereon and an underlying substrate between which printed copy may be placed for determining alignment corrections. Preferably a spacer lies between the cover and the substrate which is preferably approximately the thickness of the copy whose printing alignment is to be determined using the device. Most preferably, the spacer is a reference guide against which a sheet of copy may be placed when determining alignment, using the markings on the second substrate, although the reference guide may be separated from the spacer, or used in place of the spacer.

7 Claims, 8 Drawing Figures

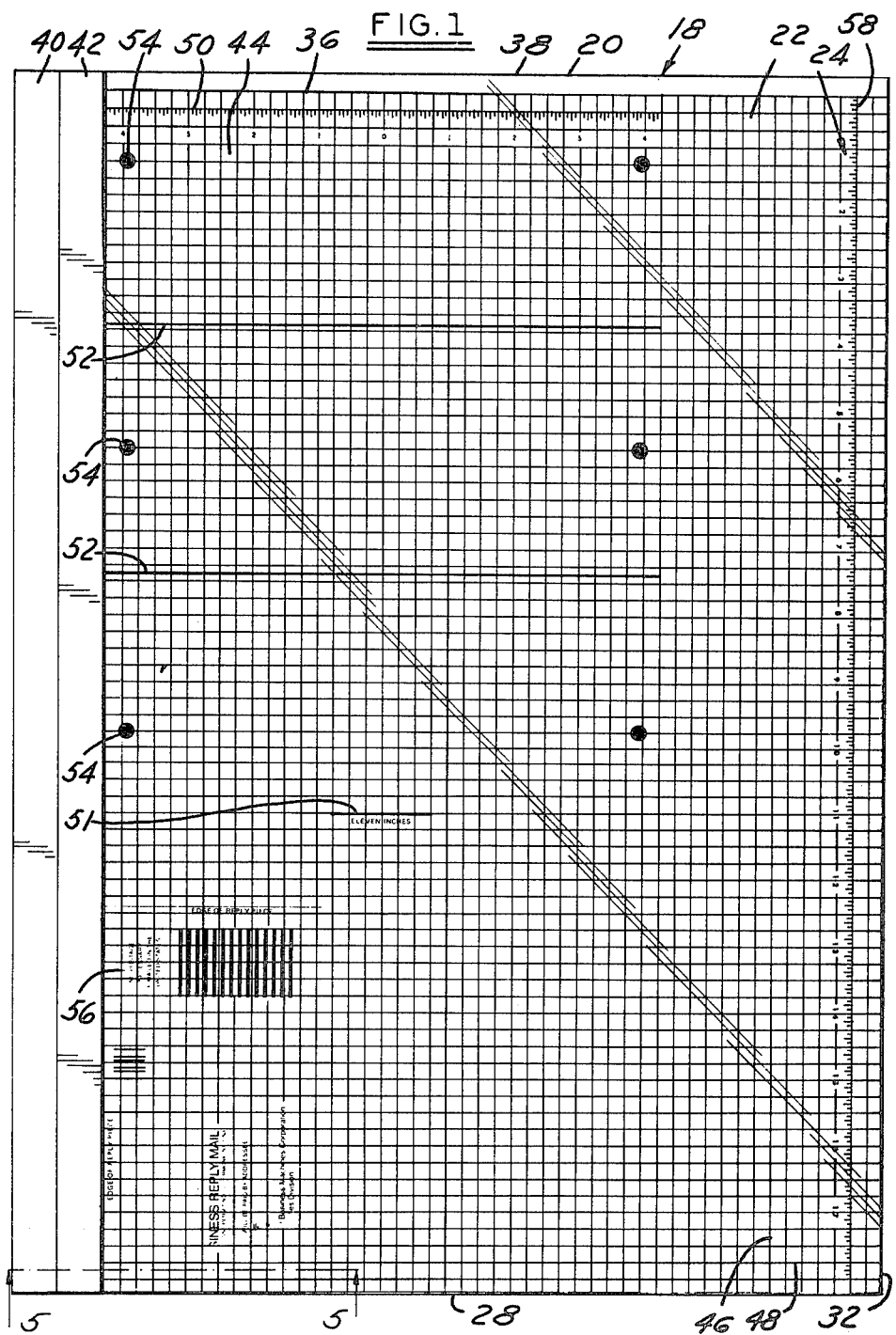

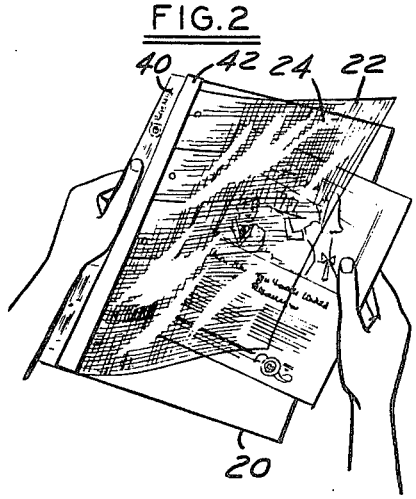
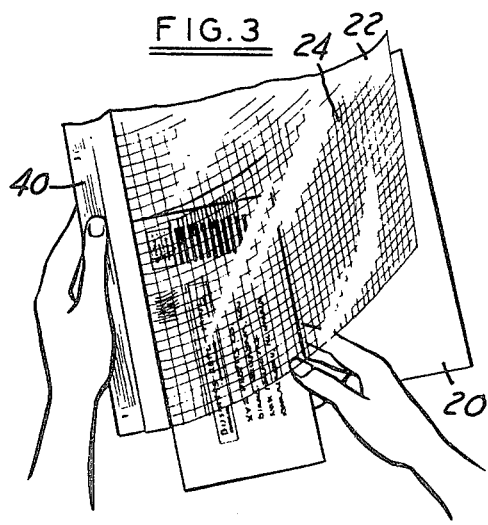
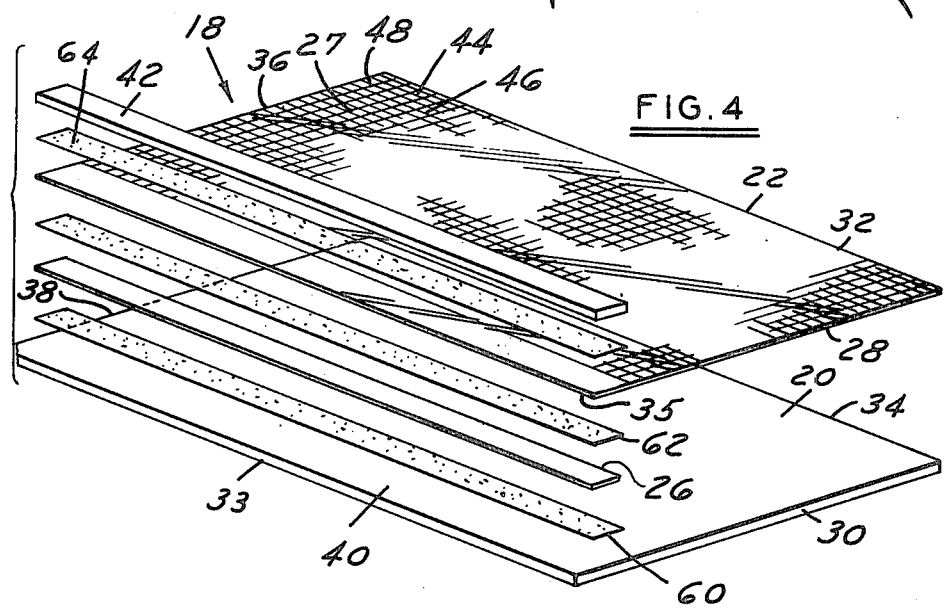
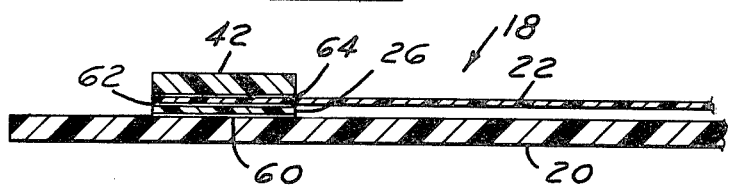

REGISTRY DEVICE AND METHOD FOR USING SAME

FIELD OF THE INVENTION

This invention relates to a registry device for visually determining proper alignment of printer's copy.

BACKGROUND OF THE INVENTION

In the printing and copying industry, it has always been the responsibility of the production person to position the image on the work being printed or copied, so that the finished product has the best possible appearance. Traditionally, the procuction person is the pressman. In practice, he will set up a job on a press and run a first copy called a press sheet. Then he will take that press sheet to a table where measurements can be taken to determine whether or not adjustments must be made to the press prior to the production run.

Usually, he will utilize a light table, T-squares, rulers, and straight edges in an attempt to determine what corrections, if any, must be made in order to produce better copy. The light table is a large table having a glass top and an underlying light which shines through the glass and the paper to facilitate his work. Because of its size, the table generally serves more than one pressman, and is kept in a room apart from the pressroom.

SUMMARY OF THE INVENTION

I have invented a registry device, which allows a quick visual determination of what corrections, if any, must be made to a press sheet in order to have an acceptable production run. The device is designed to be compact, lightweight and portable for use by the pressman at his work station, so that he will not have to leave his work station. It is an object of the invention to make correction determinations without the need to use other devices such as work tables or T-squares.

The device includes a transparent cover sheet having markings thereon for use in determining the proper alignment of printing on an underlying copy page when the printing faces the cover sheet and is appropriately positioned. As the cover sheet is substantially transparent to the printing on the underlying copy, the degree of misalignment, if any, between the markings on the cover sheet and the printing on the printer's copy can be determined when the copy is properly positioned. The device may also include a spacer placed to separate the cover sheet from the underlying surface upon which the copy is placed. Preferably, the spacer will serve as a reference guide against which an edge of copy will be placed when using the markings on the cover sheet, although a reference guide could be used with or without the spacer.

Preferably, the cover sheet will be attached to the spacer, which in turn will be attached to an underlying surface, which underlying surface serves as the support for the copy.

BRIEF DESCRIPTION OF THE DRAWINGS

FIG. 1 depicts a plan view of a device embodying the invention;

FIG. 2 depicts a view of the device in which a page of printer's copy is being inserted;

FIG. 3 depicts a frontal view of the device in which an envelope is being inserted;

FIG. 4 depicts an exploded perspective view of the device;

FIG. 5 depicts a section of the assembled device taken along 5—5 of FIG. 1.

DETAILED DESCRIPTION OF THE INVENTION

Figure 6:
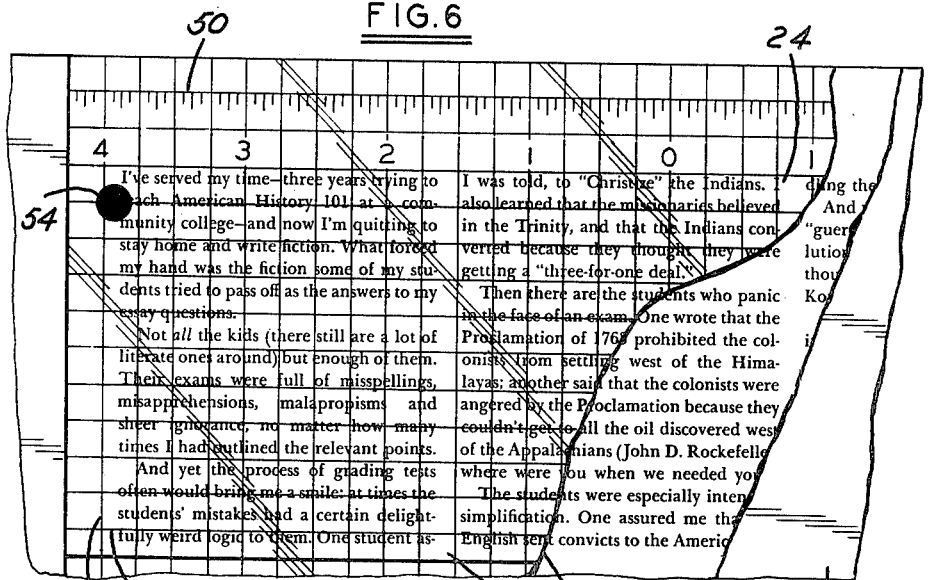
FIGS. 6-8 depict fragmentary views of the device with printer's copy in place for alignment determination purposes.

As shown in FIG. 1, the invention is embodied in a registry device 18 which includes a substrate such as a base 20, a cover sheet 22 having markings 24, and a base line reference guide 26 for the markings 24.

Printer's copy may be placed between the cover 22 and the base 20 with the copy being aligned with the guide 26 and appropriate markings 24 to ascertain need alignment corrections from the printing thereon, where the term "printing" or "printed matter" includes any symbols on the copy, including pictures, letters, or other marks, irrespective of how they were placed there.

Generally, both the base 20 and the sheet 22 will be rectangular, with base 20 having a top 38, bottom 30, left 33 and right edge 34, and with sheet 22 having corresponding top 36, bottom 28, left 35 and right edges 32.

Preferably, the base 20 and the sheet 22 are essentially plane parallel rectangles which are substantially in registration with one another. Generally they will be flexibly joined near one edge, with the bottom edge 28 of the sheet 22 meeting the bottom edge 30 of the base 20, and the right edge 32 of the sheet 22 meeting the right edge 34 of the base 20.

In those embodiments in which the top edge 36 of the sheet 22 does not fully extend to the top edge 38 of the base 20, the top edge 36 of the sheet 22 can be used as a marking guide for marking press sheets, scoring perforation, etc., and the underlying base 20 can be used to support the workpiece, especially in the region where the marking, scoring, perforation, etc., is performed.

Generally, the markings 24 will be in a markings area 27 which is in spaced relation to a reference guide 26. Preferably, the reference guide 26 will be at the left edge of the markings area 27 and will serve as a zero base line for the markings 24, which markings are position indicia.

As shown in the embodiment of FIG. 1, the device 18 can have a handle portion 40 to the left of the markings area 27. The handle portion can include the left edge 33 of the base 20 and the area immediately to the right.

As shown in FIG. 1, a facing 42 may cover the sheet 22 in the area immediately to the left of the markings area 27. The facing 42 is preferably a rectangular strip of material overlying the sheet 22 and the reference guide 26. The facing 42 aids in securing the sheet 22 to the base 20. Generally, the facing 42 will lie between the handle portion 40 and the markings area 27. And in some instances the facing 42 may be part of the handle portion 40.

The sheet 22 has a number of different types of markings 24 thereon. Although the sheet depicted in FIG. 1 is marked primarily for use with workpieces such as $8\frac{1}{2}'' \times 11''$ sheets of paper and for business envelopes, the markings 24 may be drawn to a different scale for use with copy of other types and sizes, or where a different measuring system, such as the metric system, is preferred.

The markings 24 on the sheet 22 may include a grid 44 formed by crossing equally spaced vertical parallel lines 46 and equally spaced horizontal parallel lines 48. Because of these equal spacings, the grid 44, which preferably covers the entire sheet 22 in the area of markings, may be used, usually in conjunction with the other markings 24, to determine necessary alignment corrections. Preferably, the markings will be blue, although they can be any color or combination of colors. In the depicted embodiment the lines are ¼" apart.

A centering scale 50 for use in determining the centering of the work on the printer's copy may be included as a marking 24, preferably near the top edge of the sheet 36 and parallel with a horizontal line 48 of the grid 44. For an 8½"×11" copy, the scale 50 starts at the reference guide 26 at 4¼ inches and extends to the right with the scale first decreasing from 4¼" to 0" and then increasing from 0" to 4¼". The centering so depicted is for 8½"×11" copy with the zero inch mark being the centering mark when a long edge of the sheet of paper is placed against the reference guide 26 shown in FIG. 5.

A printer's copy page bottom alignment mark 51 may be included as a marking 24, which preferably is placed on the sheet 22 parallel to the top edge 36 of the sheet 22. In the case of an 8½"×11" copy, the bottom page mark 51 is 11" from the top of the sheet 36. Thus, preferably, when using the centering scale 50, the long edge of the copy will be parallel with an abut the reference guide 26 and the bottom edge of the copy will be parallel with and abut the bottom page mark 51.

Fold marks 52 are markings 24, which may be placed on the sheet 22, for determining if print or other images on the copy will appear on a fold. This is used for copy which is intended to be folded for insertion into an envelope, for example. Generally, the fold marks 52 will be a set of two parallel lines which divide the distance between the top edge of the sheet 22 and the bottom page mark 51 into three approximately equal sections.

A set of ring hole marks 54 may be included as markings 24 which correspond to the ring holes which may be punched into the finished copy. Generally, these ring hole marks 54 will be spaced on the sheet 22 between the top of the sheet and the bottom page mark 51, and distanced from the reference guide 26 as in a standard three ring binder. This allows the printer to see if any portion of the image printed on the copy will be punched out when a ring hole is formed, and then to make necessary adjustments. In one embodiment, the ring hole marks may be actual holes in the sheet 22.

Postal markings 56 for determining whether or not the proper Post Office letter markings are being made may be included as markings 24. Generally, these postal markings 56 have an edge of reply piece marking parallel a side of the sheet 22. Preferably, the edge of reply piece marking will be perpendicular the reference guide 26 so that when the top edge of an envelope or card or other copy is placed against the reference guide 26 and the appropriate side edge of the copy is placed against the edge of reply piece marking, the postal markings 56 on the sheet 22 will be properly positioned on the copy.

A ruler 58 is a marking 24 which may be printed on the sheet 22, preferably parallel to and proximate the right edge 32 of the sheet 22.

Naturally, other useful markings may be included, such as address markings (not shown) for determining where the address should be on copy to be inserted into an envelope with an address window so that the address can be displayed in the window.

In the embodiment of FIG. 2, the copy can be inserted by first securing the registry device 18, such as by grasping the handle 40 with one's hand; then raising the right edge of the sheet 32, so that a printer's copy, with the printing facing the cover sheet, may be inserted therein, with a side edge against the reference guide 26 and the bottom edge against the bottom page mark 51.

Similarly, in the embodiment of FIG. 3, an envelope can be inserted into the registry device 18 with one edge of the envelope against the reference guide 26 and the marking on the envelope being lined up with appropriate postal markings 56. Then the sheet 22 will be laid flush with the surface of the base 20 so that the postal markings 52 line up as closely as possible to the postal markings made by the printer on the copy. Corrections may then be determined by the deviation between the markings 24 on the sheet 22 and the markings on the printer's copy.

FIG. 4 shows how the facing 38, the sheet 22, the guide 26 and the base 20 are bonded together in one embodiment, to form the registry device 18. A first strip of two-faced tape 60 is laid on top of the base 20 parallel to the base's left side, but sufficiently far from the left side to allow a space for the handle 36. The reference guide 26, a strip of preferably rigid rectangular material having approximately the same dimensions as the first tape 60 is laid on top of, and substantially in registration with, the first tape 60. A second strip of two-faced tape 62 of approximately the same dimensions as the reference guide 26 is then, similarly, laid on top of, and substantially in registration with, the guide 26. The sheet 22 is then laid on top of the base 20 so that the right edge of the sheet 22 extends to the right edge of the base 34 and the bottom edge of the sheet 28 extends to the bottom edge of the base 30, with the area of the sheet 22 proximate to and parallel the left edge of the sheet 22 being laid on top of the second strip of two-faced tape 62, so that the markings 24 begin at the right edge of the guide 26. The farther the left edge of the sheet 22 extends over the second strip of two-faced tape 62, the better the bonding. Consequently, the sheet 22 will preferably extend completely to the left edge of the base 20.

In a prefered embodiment, a third strip of two-faced tape 64 is laid atop sheet 22 substantially in registration with the second underlying strip 62, and following the earlier procedure, a facing 42 is laid atop of, and substantially in registration with, the third strip of two-faced tape 64.

As shown in FIG. 5, the registry device 18 has a guide 26 between the base 20 and the sheet 22 with markings 24. The guide 26 acts as a spacer as it is sufficiently thick to allow the insertion of a sheet of paper with the markings on the sheet 22 and the copy, but thin enough to act as a true reference line for the markings 24. Therefore, the guide 26 plus adhesive tape will preferably be approximately the thickness of a sheet of paper which is generally about 0.08 to 0.13 inches thick, and more preferably the space between the sheet 22 and the board 20 will be approximately 0.010 inches in height. However, thicker or thinner guides 26 can be used depending on the thickness of the paper stock to be used and the desired accuracy of the markings 24 registration.

The facing 42 serves, in part, a decorative purpose. It also serves to act as an aid in securing the sheet 22 to the base 20, partly because some people will grip the registry device 18 at the facing 42, and partly because, in some embodiments, the facing 42 itself will aid in securing the sheet 22. Securing the sheet 22 is desired because of the need to have accurate registration.

Similarly, although the sheet 22 does not have to extend to the left of the facing 42, such extension also serves to insure securement of the sheet 22, for a person using the registry device 18 will most likely grip the registry device 18 along the left edge, thereby holding the sheet 22 in place. This tends to reduce strain on the sheet 22 where it is bonded to the base 20, thus increasing its life span and insuring accurate registration.

Besides using two-faced tape, rivets, bolts, or other fastening means may be used. It is felt that the use of tape or adhesive is preferable as tape and adhesives tend to cover more surface area, thus reducing the possibility of shift in position of the sheet 22 in relation to the guide 46. However, the use of a pin system such as afforded by rivets, bolts, and the like, would allow pre-perforated sheets to be added or replaced with minimal alignment problems.

Generally, the sheet 22 will be glass or plastic. Preferably, the sheet 22 will be a clear transparent flexible plastic such as MYLAR, a trademark of the E. I. DuPont deNemours and Co., or TXP, a trademark of Transilwrap Corp. for extruded polyester. The plastic should be smooth and flexible, but have memory to return to a flat planar mode when laid upon the base 20.

Although the markings 24 may be printed onto the sheet 22, the sheet 22 may be photosensitive so that the markings 24 may be photographically transferred and imprinted onto the sheet 22.

The base 20 is preferably a solid, rigid material such as wood, plastic or metal. The rigidity allows the base 20 to serve as a portable work bench and provides surer registration than a non-rigid base 20. However, a non-rigid base can be used.

Preferably, the two-faced tape will be a 3M brand tape. However, any two-faced tape can be used which is compatible with the material of the sheet 22, the guide 26, and the base 20.

The reference guide 26 may be of any material. Preferably the guide will be plastic, but may be of wood, metal or other suitable material and, preferably, the guide 26 will have or provide a straight edge.

In operation, the printer's copy will be inserted into the registry board 18 as shown in FIGS. 2 and 3, by first securing the registry board 18, such as by gripping the registry device 18 with a hand and then raising an edge of the sheet 22 and inserting printer's copy between the sheet 22 and the base 20 with another hand, until the desired edge of the copy rests against the guide 26. Then the sheet 22 will be laid atop the copy and the copy adjusted until the appropriate markings on the sheet 22 line up as nearly as possible with the printer's copy.

For most of the markings 24, the copy will be inserted as in FIG. 2, in which the copy is placed face up into the device 18 between the overlying sheet 22 and the underlying base 20. The left edge of the copy will be placed so as to be parallel to and abut the reference guide 26, while the bottom edge of the copy will be placed so as to be parallel to and abut the bottom of page mark 51. Such placement will be typical for use of the centering scale 50, for use of the fold line marks 52, and for use of the ring hole marks 54. Thus, when the sheet 22 is laid on top of the copy, proper alignment determinations can be made.

When postal markings are to be determined for alignment, the copy will be preferably inserted as in FIG. 3. That is, the top edge of the copy will be placed against the reference guide 26 and the side edge of the copy closest to the postal markings will be placed against the edge of reply piece marking, so that when the cover sheet 22 is placed on top of the copy envelope, alignment determinations may be made.

Although a righthand system has been depicted for the register/positioning device 18, a lefthand system or any other handed system may also be used.

As shown in FIG. 6, the margin on the printer's copy is improper if binder perforations are to be made, for part of the printing will be punched out when the binder perforations are made. In this particular instance, part of the first word on the second line of typing in the lefthand column will be punched out. Consequently, the printer should adjust the lefthand margin to avoid this problem.

Because of the scale at the top of the page, the printer can see that each pair of parallel vertical lines 46 has the same definite space between them, such as the 0.25 inch space depicted in FIG. 6. Thus, the printer can immediately see by looking at FIG. 6, that the width of the margin must be increased by at least $\frac{1}{8}$ inch in order to avoid having parts of words punched out when holes are punched into the paper for insertion into a ring binder.

Figure 7:
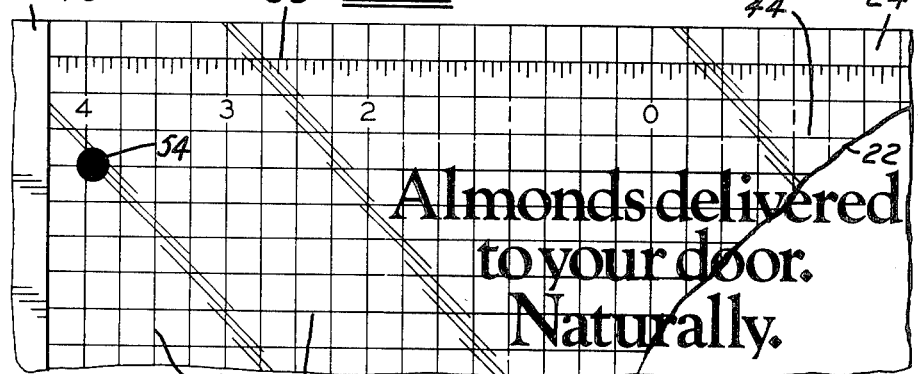

In FIG. 7, the printer's copy was inserted as in FIG. 6. Here, the printer is interested in determining whether or not the title, "Almonds Delivered to Your Door Naturally" is centered. To do this, he would immediately see, by looking at the centering scale 51, whether or not the title is centered. If the title is off-center, then, because the grid 44 is graduated, he can quickly determine how far, and in what direction, to shift the title.

Figure 8:
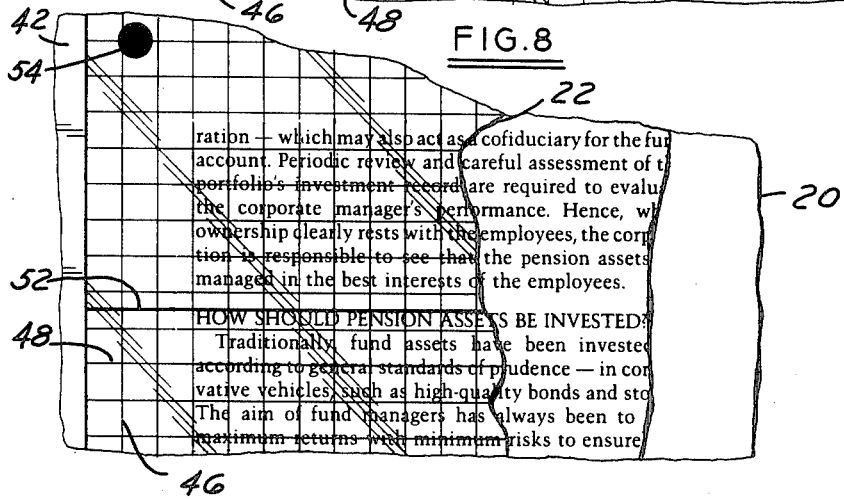

In FIG. 8, the printer can see that the fold line 52 lies along the upper edge of the sentence with the words "How should pension assets be invested". Consequently, the printer would shift the typing down slightly further to avoid the problem of printing a line in a fold line 56. Such a shift will result in a better appearing finished product.

The printer's copy may be lined or marked for perforation by using the upper edge 36 of the sheet 22. In this instance, the base 20 itself will serve to support the copy while the mark is being made.

I claim:

1. A registry device for determining printing position on a press sheet comprising, in combination:

a relatively rigid base member of a size to underlie and support the press sheet and having top and side edges;

a flexible and transparent cover sheet of a size and shape approximating that of the base member and having top and side edges and attached to the base member adjacent an edge thereof;

a spacer strip providing a straight edge disposed between the cover sheet and base adjacent a side edge thereof, said spacer having a thickness to space apart the base and cover sheet a distance approximately the thickness of the press sheet so that a pressman may readily place the press sheet therebetween with an edge of the press sheet against said straight edge or readily remove a press sheet from between the base and cover sheet;

said cover sheet having a grid pattern thereon of uniformly spaced lines with some extending parallel to said straight edge and others extending perpendicular thereto with the intervals between the lines being related to conventional ruler scale measure, ruler scale indicia on the cover sheet coincident with said grid pattern including a centering line parallel to said straight edge and spaced therefrom by one-half the width of a press sheet, and fold indicating lines on the cover sheet perpendicular to said straight edge and spaced from the top edge by distances trifurcating the length of a press sheet aligned with said straight and top edges.

2. The registry device of claim 1 wherein there are ring binder hole indicium on the cover sheet for determining where binder holes will appear on the press sheet.

3. The registry device of claim 1 wherein there is an address indicium on the cover sheet for determining the proper position of an address on the press sheet.

4. The registry device of claim 1 or 2 or 3, wherein there is a page bottom indicium parallel to and spaced from the top edge and with which the bottom edge of a press sheet will be in registry when using the centering line, or the fold lines.

5. The registry device of claim 1 wherein there are indicium on the cover sheet for determining the alignment of postal markings on a press sheet inserted in the device.

6. The invention defined by claim 1 wherein the top edge of the cover sheet is spaced below the top edge of the base member thereby enabling use of the top edge of the cover sheet as a marking guide for marking a press sheet perpendicular to said straight edge.

7. A method of correcting alignment of copy on a press sheet, comprising the steps of:
    placing the press sheet between a base and a flexible transparent cover sheet secured to the base adjacent one edge;
    positioning the press sheet against a straight edge provided along said one edge between the base and cover;
    observing the horizontal and vertical alignment of copy on the press sheet by reference to a grid of uniformly spaced horizontal and vertical lines on the cover sheet which are coincident with conventional ruler scales along the top and one side of the cover sheet; and
    thereafter adjusting the press by the distance shown on the ruler scales during the foregoing observation to correct alignment on a subsequent run of the press sheet.

* * * * *